Patented June 14, 1938

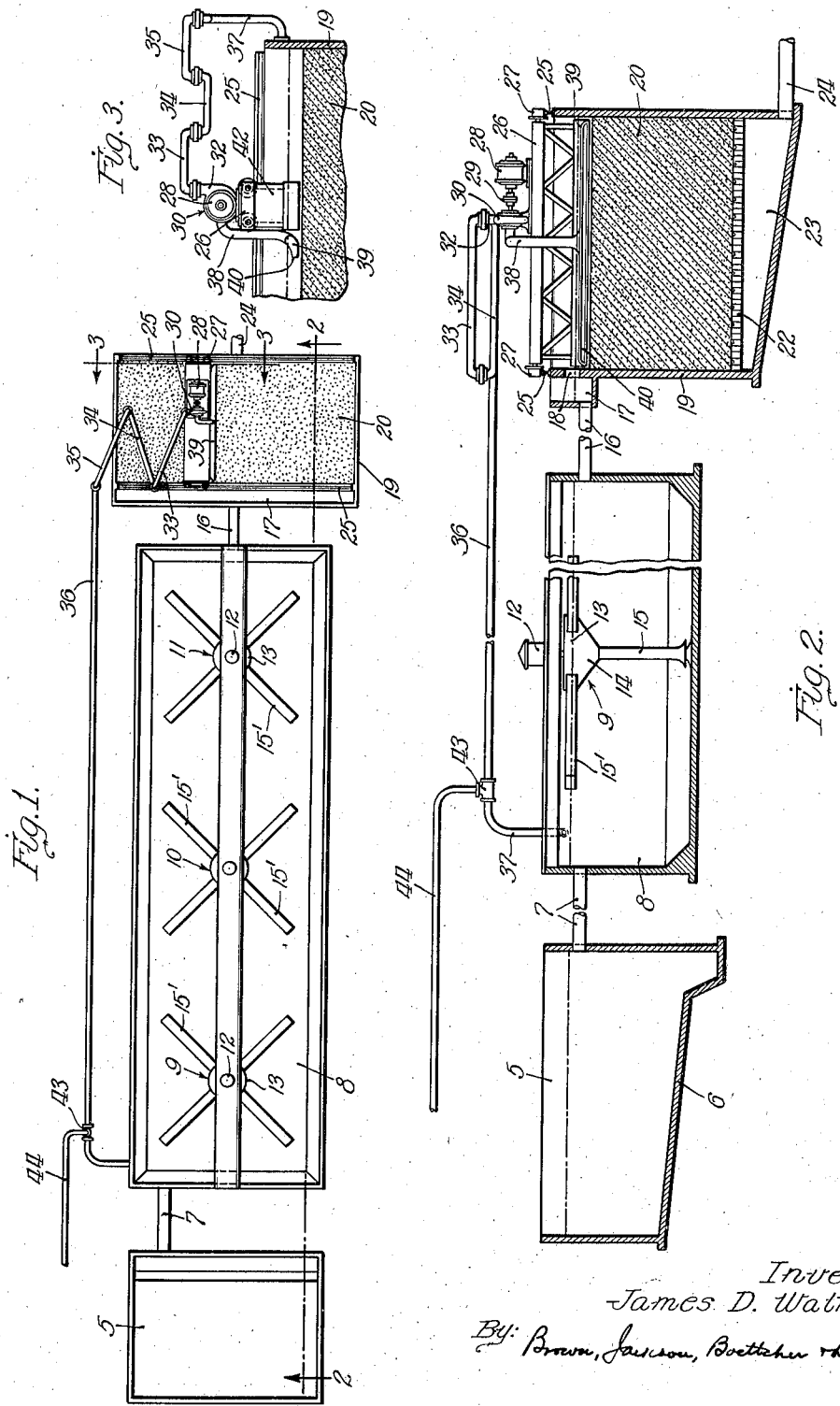

2,120,658

UNITED STATES PATENT OFFICE 2,120,658

ACTIVATED SLUDGE PROCESS AND APPARATUS THEREFOR

James Donald Walker, Aurora, Ill., assignor to The American Well Works, Aurora, Ill., a corporation of Illinois Application December 13, 1935, Serial No. 54,204

8 Claims. (Cl. 210—8)

This invention relates to a method and apparatus for the treatment of sewage, and more particularly is directed to a modification of the activated sludge process of sewage treatment.

The present invention, in its broader aspects, contemplates the increasing of the efficiency, effectiveness and accuracy of control of the process while at the same time decreasing the time required in completing the process from its initial stage to the final stage of treatment.

Heretofore the standard practice in the operation of an activated sludge process has comprised the mixing of the sewage or waste undergoing treatment with returned activated sludge in a so-called aeration tank, such as described in my copending application, Serial No. 748,284, filed October 15, 1934, now matured into Patent No. 2,082,759, dated June 1, 1937 in which the mixed liquors were agitated and oxygenated to allow the aerobic bacteria in the sludge to act upon the sewage or waste to convert the more or less complex nitrogenous, carbonaceous and sulphureous compounds into the simpler compounds which are wholesome and inoffensive. Prior treatment or conditioning of the liquors may, if desired, be provided before introduction into the aeration tank.

The mixed liquor from the aeration tank was then conducted to a settling tank or the like, where it underwent a protracted period of quiescence. In this tank the activated sludge would gradually drop out of suspension, due to a slightly greater specific gravity. This settled activated sludge was then drawn off from the bottom of the tank and returned, by pumps, back to the initial phase of the process to complete its cycle. The clarified supernatant represented the treated sewage.

The activated sludge process thus followed more or less directly the chemical precipitation processes known at the time, that is, flocculating the matter to be separated, (in the sludge process this is done biologically instead of chemically), allowing the floc to settle in a protracted period of quiescence, and the drawing off of the supernatant liquor as the treated portion. This supernatant liquor was subsequently strained, if it carried over sufficient floc to warrant such a step.

Quite often, in carrying out such a process, the sludge would "bulk" and refuse to settle in the final settling tank. As the sludge contained all of the absorbed organic impurities separated from the sewage, its appearance in the plant effluent defeated the purpose of treatment, since the sludge itself is extremely putrescible.

Technique of plant operation heretofore has been directed entirely toward keeping the activated sludge heavy enough that it will settle in the settling tank. This is the limitation of the process and the operation must be such as to insure that the sludge will settle to enable its removal at the end point of the process.

However, the sludge is most useful when it is "bulked", since it has the greatest surface area and is at a point of maximum efficiency for removing suspended, colloidally suspended, and dissolved solids from the sewage by the phenomenon of surface adsorption.

Certain steps have been taken to secure, to as great an extent as possible, settling of the sludge in the settling tank, but these have proved extremely costly and not entirely successful. In some plants chemical filters are employed posterior to the final settling tank to remove that portion of the activated sludge which has not settled in the tank, but such removed sludge has been wasted.

Another great disadvantage of this process as heretofore employed resides in the fact that activated sludge is a continuous user of dissolved oxygen, approximately 120 parts per million per hour, and, during the protracted period required for settling, the sludge is receiving no oxygen and consequently degenerates. This effect is sometimes so serious that the sludge has to be reactivated before it can be used again, or possibly cannot be used again in the process at all because it has become anaerobic in character. Thus the final settling tank has been considered more or less as a necessary evil in the process, and may be the cause of failure of the entire plant.

The present invention has as its primary object the elimination of the final settling tank from the process, and with it the elimination of the protracted time delay required for settling and the danger of degeneration of the activated sludge.

One of the important objects achieved in the present invention is the utilization of sludge, whether bulked or otherwise, thereby preventing cessation of the process when bulking is encountered.

Another object of the present invention is the separation of the activated sludge from the treated wastes by mechanical separation other than sedimentation. This mechanical separation process provides for continuously returning activated sludge immediately to the initial part of the aeration phase of the process. This reduces the time during which the sludge receives no oxygenation from several hours down to a few seconds.

As a feature of this mechanical separation, I provide a process whereby the separated sludge will not become too dry, since this may cause a loss of its efficiency. A relatively high water content in the sludge has been found not to be objectionable, but actually desirable.

Other objects and advantages of the present invention will appear more fully from the following detailed description which, taken in conjunction with the accompanying drawing, will disclose to those skilled in the art the particular construction and operation of a preferred form of the present invention.

In the drawing:

Figure 1 is a top plan view of apparatus for carrying out the present invention;

Figure 2 is a vertical sectional view taken substantially on line 2—2 of Figure 1; and Figure 3 is a partial sectional view taken substantially on line 3—3 of Figure 1.

Referring to the drawing, there is provided a primary tank 5, having a sloping bottom surface 6, which is adapted to receive the untreated sewage or waste, and which is connected through the conduit 7 to the aeration tank indicated generally at 8.

The aeration tank 8 may be of any suitable design, employing any suitable type of means for producing agitation and oxygenation of the mixture of activated sludge and sewage introduced thereinto. As an illustration of one form of such tank I may employ an aeration tank of the type shown in my copending application, Serial No. 748,284, filed October 15, 1934, now matured into Patent No. 2,082,759, dated June 1, 1937 employing a plurality of aerating devices 9, 10 and 11, each of the aerating devices including an actuating motor 12, a central launder or mixing cone 13, a liquor well 14, and a downflow tube 15. The launder 13 is preferably provided with a plurality of extending arms 15' which are adapted to draw liquor from restricted portions of the surface of liquor in the tank into the launder 13, where it is mixed with entrained air particles and projected downwardly from the well 14 through the tube 15 by means of an impeller driven by the motor 12. The entrained air and surface liquor is then discharged outwardly substantially radially along the bottom of the tank 8, producing a flow cycle that assures that all of the liquor in the tank will be continuously circulated through this cycle, whereby the aerobic bacteria in the activated sludge will receive sufficient oxygen to promote growth, and to allow them to feed upon the complex nitrogenous particles in the untreated liquor to convert these complex elements into the simple nitrates and nitrites. From the aeration tank, the mixed sewage which has been treated, and the activated sludge, is passed through the discharge conduit 16 to a liquor well 17, and from this well is introduced through suitable openings 18 onto the top surface of a filter bed 19, which preferably is in the form of a sand filter having fine particles of sand forming the bed portion 20 and supported upon a suitable underdrain 22, through which the effluent or treated liquor may pass into the chamber 23, from whence it is discharged through the conduit 24.

Mounted upon suitable tracks 25 extending longitudinally along the side walls of the filter 19 is a frame or carriage member 26, having suitable wheels 27 mounted for movement along the tracks.

Supported on the upper portion of the carriage 26 is a motor 28, connected through the coupling 29 to a pump 30, which pump is of a type capable of handling sludge or the like, and which has its outlet 32 connected through the jointed conduit members 33, 34 and 35 to a conduit 36 which extends along the aeration tank 8 back to the forward portion of this tank, and is thence led into the tank through the conduit 37, as shown in Figure 2.

The inlet of the pump 30 is connected through the conduit 38 to a nozzle member 39 which extends transversely across the tank and is provided with an opening in the forward portion thereof indicated at 40. As the carriage 26 moves forwardly across the tank along the upper surface of the filter bed 20, the nozzle 39 scoops up the matted activated sludge which has been deposited upon the surface of the bed as the mixed liquors from the aeration tank are discharged from the well 17 into the tank. This sludge has had the treated liquor drained therefrom through the filter bed 20, and the activated sludge is sucked up the conduit 38 by the suction of the pump 30, as well as by the mechanical pick-up action produced by the forward motion of the nozzle 39, and is discharged by the pump 30 through the conduit 36 and inlet connection 37 back to the forward portion of the aeration tank 8. The effluent liquor passes downwardly through the filter bed 20, and is discharged outwardly through the discharge conduit 24.

The carriage 26 also supports a sand cleaner 42, which may be of any desired type, and which is adapted to pick up the sand adjacent the upper surface of the filter bed 20, to clean this sand and return it to the filter bed as the carriage moves across the bed. In cleaning the sand, a certain amount of water is picked up, and is discharged through the pump 30 with the activated sludge, which increases the fluidity of the sludge by raising its water content.

The mechanical separation thus effected provides for separation of the sludge in a state where it is not too dry, whereby it does not lose any of its efficiency, and the sludge is possessed of a relatively high water content as it is passed through the conduits back to the aeration tank.

The mechanical separation phase of the process also is of extreme importance in providing for continuous reuturn of the activated sludge, without the protracted period of quiescence heretofore required. Thus the time during which the sludge receives no oxygenation is reduced from several hours to a few seconds.

While the illustrated emodiment of the invention discloses one manner in which this mechanical separation is to be effected, it is to be understood, and is believed obvious, that other means of mechanical separation may be employed, such as the use of rapid sand filters, pressure filters, vacuum filters, centrifuges, and other devices of similar characteristics which are capable of separating solid particles, or relatively solid particles, from an effluent liquor.

It will be noted that a connection 43 is provided in the conduit 36, and is connected to the conduit 44, which may be connected to waste or the like, since during most conditions of operation only a certain portion of the activated sludge is returned to the aeration tank, inasmuch as all of the activated sludge need not be used. For this reason, the waste connection is provided, as I have found that under ordinary operating conditions about 10% of the separated sludge will be passed to waste.

The primary purpose of the mechanical separation of the sludge as it leaves the aeration tank is to eliminate the protracted time required for gravimetric settling of the sludge, and in order to provide a continuous flow cycle for the sludge, so that its efficiency will not be reduced, or the sludge be degenerated during any protracted period of quiescence.

It will be obvious that less oxygen and therefore less power will be required in the aeration tank, since bulking will offer no hindrance to the process, and the sludge will not have to be reconditioned after leaving the final phase of the process. In this connection, the uncontrollable bulking of sludge will not interfere with the process, and will even tend to make it more efficient.

While I am aware that various changes may be made in the apparatus shown and described, or other apparatus having equivalent functions may be substituted therefor, I do not intend to limit my invention to the particular details of construction and operation shown and described, but only insofar as defined by the scope and spirit of the appended claims.

I claim:

1. The method of treating sewage by the activated sludge process which comprises mixing said sewage with activated sludge floc, aerating said mixture, drawing off the mixture, separating the activated sludge floc from the treated liquor by passing the liquor through a filtering medium and mechanically removing said activated floc from said filtering medium and returning the same substantially continuously for remixture with untreated sewage.

2. The method of treating sewage by the activated sludge process which comprises introducing said sewage into contact with activated sludge floc in an aeration tank, aerating the mixture for a sufficient interval to biologically effect separation of organic impurities from the sewage, conducting the mixture of treated liquor and sludge to a sand filter, draining off the treated liquor through said filter, mechanically picking up the activated sludge from the upper surface of said filter, and continuously returning at least a portion of said sludge to said aeration tank.

3. The method of treating sewage which comprises introducing said sewage into contact with activated sludge floc in an aeration tank, controlling the aeration of said floc, conducting the mixture of treated liquor and sludge to a sand filter, draining off the treated liquor, mechanically picking up the activated sludge from the upper surface of said filter, simultaneously cleaning the adjacent portion of sand in said filter and returning the cleaned sand to said filter, and continuously returning at least a portion of said sludge to said aeration tank.

4. In an activated sludge apparatus, an aeration tank, means for introducing sewage into said tank in contact with activated sludge within said tank, a filter bed, means for discharging the mixed liquor and sludge from the tank onto the top surface of said filter bed, means movable along the upper surface of the bed for picking up the activated sludge matted thereon, the treated liquor draining from said surface downwardly through said bed, means for cleaning the filter medium adjacent said surface and returning it to said bed, and means for returning said sludge to said aeration tank including means for receiving liquor from said cleaned medium and admixing the same with said returning sludge.

5. In an activated sludge apparatus, an aeration tank, means for introducing sewage into said tank in contact with activated sludge within said tank, a filter bed, means for discharging the mixed liquor and sludge from the tank onto the top surface of said filter bed, means movable along the surface of the bed for picking up the activated sludge matted thereon, the treated liquor draining from said surface downwardly through said bed, means for cleaning the filter medium adjacent said surface and returning it to said bed and removing liquor therefrom, said last-named means conducting a portion of said removed liquor to said sludge, and means for returning said sludge and said portion of liquor to said aeration tank.

6. In the activated sludge process, the method of preventing degeneration of the activated sludge which comprises withdrawing the sludge and treated liquor from the aeration phase of the process to a filter bed, maintaining the sludge on the surface of said bed while the treated liquor drains therethrough, and continuously removing the sludge from the surface of said bed and returning it to the aeration phase of the process.

7. The combination, with apparatus for treating sewage by the activated sludge process, including an aeration tank and a sand filter bed, of means connected directly to said tank for depositing the sludge discharged from said tank upon said filter bed to drain off the major portion of the liquor in said sludge through said bed, and power operated means comprising a member movable across said bed for picking up the sludge and the remaining portion of said liquor from the surface of said bed and returning it to said tank.

8. An activated sludge process of the class described, characterized by the aeration of the mixture of sewage and sludge for a sufficient interval to effect biological separation of organic impurities from the sewage, the withdrawal of the sludge and treated liquor from the aeration phase of the process to a filter bed, the separation of the sludge from the liquor by draining off a major portion of the liquor through said bed, and the continuous return of the sludge from the top of said bed to the aeration phase of said process.

JAMES DONALD WALKER.